(12) United States Patent
Umezawa et al.

(10) Patent No.: US 7,513,837 B2
(45) Date of Patent: Apr. 7, 2009

(54) THREE-PIECE SOLID GOLF BALL

(75) Inventors: Junji Umezawa, Chichibu (JP);
Kazufumi Tabata, Chichibu (JP)

(73) Assignee: Bridgestone Sports Co., Ltd, Tokyo (JP)

( * ) Notice: Subject to any disclaimer, the term of this patent is extended or adjusted under 35 U.S.C. 154(b) by 0 days.

(21) Appl. No.: 11/519,866

(22) Filed: Sep. 13, 2006

(65) Prior Publication Data

US 2007/0015606 A1    Jan. 18, 2007

Related U.S. Application Data

(62) Division of application No. 11/056,267, filed on Feb. 14, 2005, now Pat. No. 7,140,980.

(30) Foreign Application Priority Data

Feb. 16, 2004  (JP)  ............................. 2004-038651

(51) Int. Cl.
*A63B 37/06* (2006.01)
(52) U.S. Cl. ..................................... 473/373
(58) Field of Classification Search ................ 473/374, 473/373, 368, 376
See application file for complete search history.

(56) References Cited

U.S. PATENT DOCUMENTS 5,803,831 A * 9/1998 Sullivan et al. ............. 473/374
6,106,415 A * 8/2000 Masutani et al. ............ 473/374
6,379,268 B1 * 4/2002 Yamagishi et al. .......... 473/371
6,659,889 B2 * 12/2003 Kasashima et al. .......... 473/374
2004/0029650 A1 * 2/2004 Higuchi et al. .............. 473/371
2005/0014577 A1 * 1/2005 Sasaki et al. ................ 473/371
2005/0181891 A1 * 8/2005 Umezawa et al. ........... 473/371

FOREIGN PATENT DOCUMENTS

| JP | 7-24085 A | 1/1995 |
| JP | 10-151226 A | 6/1998 |
| JP | 2002-315848 A | 10/2002 |
| JP | 2003-190330 A | 7/2003 |

* cited by examiner

*Primary Examiner*—Raeann Trimiew
(74) *Attorney, Agent, or Firm*—Sughrue Mion, PLLC

(57) ABSTRACT

A three-piece solid golf ball having a solid core, an intermediate layer enclosing the solid core, and a cover layer enclosing the intermediate layer and having a large number of dimples formed in its surface, characterized in that the core deforms as much as 2.6 to 3.2 mm under a load which changes from 10 kg to 130 kg, the cover layer is formed mainly from thermoplastic polyurethane such that it has a lower hardness than the intermediate layer, a surface hardness of the cover layer being 58 to 64 in terms of Shore D hardness, with the difference in hardness between the cover layer and the intermediate layer being 4 to 10 in terms of Shore D hardness, the intermediate layer and the cover layer have a total thickness of 2.2 to 3.0 mm, the cover layer has a thickness of 0.8 to 1.3 mm, and the dimples have at least four different diameters and/or depths, with the average depth being 0.125 to 0.150 mm, and amount to 250 to 390 in all. The three-piece solid golf ball exhibits adequate spin performance by iron shot and approach shot. It also exhibits good flying performance.

6 Claims, No Drawings

THREE-PIECE SOLID GOLF BALL

This is a divisional of application Ser. No. 11/056,267 filed Feb. 14, 2005 now U.S. Pat. No. 7,140,980. The entire disclosure of the prior application, application Ser. No. 11/056,267 is hereby incorporated by reference.

CROSS-REFERENCE TO RELATED APPLICATION

This non-provisional application claims priority under 35 U.S.C. §119(a) on Patent Application No. 2004-038651 filed in Japan on Feb. 16, 2004, the entire contents of which are hereby incorporated by reference.

BACKGROUND OF THE INVENTION

1. Field of the Invention

The present invention relates to a three-piece solid golf ball characterized in that the cover layer is softer than the intermediate layer.

2. Prior Art

There have been proposed various kinds of three-piece solid golf balls with a softer cover layer than an intermediate layer in order to meet demands from pro golfers and advanced amateur golfers (Japanese Patent Laid-open No. Hei 7-24085). Their improvement in spin, flight distance, and durability has also been proposed in Japanese Patent Laid-open No. Hei 10-151226. However, the desired object is not yet fully achieved.

Improved three-piece solid golf balls are disclosed in the patent documents such as Japanese Patent Laid-open No. 2002-315848, No. 2003-190330 and U.S. Pat. No. 6,659,889; however, further improvements are required.

SUMMARY OF THE INVENTION

The present invention was completed in view of the foregoing. It is an object of the present invention to provide a three-piece solid golf ball with a softer cover layer than an intermediate layer, which exhibits adequate spin performance at the time of iron shot or approach shot and also exhibits satisfactory flight performance and durability.

In order to achieve the above-mentioned object, the present inventors carried out extensive studies and found that a three-piece solid golf ball exhibits desirable performance such as long flying distance by driver shot due to decreased spin and good controllability, if it meets the following requirements for the material of the cover layer, the hardness of the cover layer, the difference in hardness between the intermediate and cover layers, the total thickness of the intermediate layer and cover layer, the thickness of the cover layer, and the amount of deformation of the solid core, and the shape of dimples. The present invention is based on this finding.

Thus, the present invention is directed to a three-piece solid golf ball having a solid core, an intermediate layer enclosing the solid core, and a cover layer enclosing the intermediate layer and having a large number of dimples formed in its surface, characterized in that the core deforms as much as 2.6 to 3.2 mm under a load which changes from 10 kg to 130 kg, the cover layer is formed mainly from a thermoplastic polyurethane such that it has a lower hardness than the intermediate layer, the cover layer has a surface hardness of 58 to 64 in terms of Shore D hardness, with the difference in hardness between the cover layer the intermediate layer being 4 to 10 in terms of Shore D hardness, the intermediate layer and the cover layer have a total thickness of 2.2 to 3.0 mm, the cover layer has a thickness of 0.8 to 1.3 mm, and the dimples have at least four different diameters and/or depths, with the average depth being 0.125 to 0.150 mm, and amount to 250 to 390 in all.

In this case, the solid core should have a distributed hardness such that the difference in hardness between the center and the surface is no smaller than 10 in terms of JIS-C hardness, the intermediate layer should have a surface hardness of 64 to 70 in terms of Shore D hardness, and the intermediate layer should be formed mainly from an ionomer resin, particularly lithium-containing ionomer resin, which is compounded with a ternary composite material composed of rubber component, polyolefin component, and polyamide component.

The three-piece solid golf ball according to the present invention exhibits adequate spin performance by iron shot and approach shot, which is demanded by pro golfers and advanced amature golfers. It also exhibits good flying performance and durability.

DETAILED DESCRIPTION OF THE PREFERRED EMBODIMENTS

The golf ball according to the present invention is that of three-piece structure consisting of a solid core, an intermediate layer enclosing the solid core, and a cover layer enclosing the intermediate layer.

The core of the golf ball according to the present invention may be formed from a rubber compound containing a co-crosslinking agent, an organic peroxide, an inert filler, an organosulfur compound, and the like. The rubber compound should preferably be based mainly on polybutadiene. "Mainly" means that polybutadiene accounts for no less than 50 wt %, preferably no less than 70 wt %, and most desirably 100 wt %, in the base material.

The polybutadiene is not specifically restricted; any species of polybutadiene which has conventionally been used for golf balls can be used. 1,4-cis polybutadiene (containing at least 40 wt % of cis structure) is desirable. The polybutadiene as the base material may be compounded with natural rubber, polyisoprene rubber, styrene butadiene rubber, and the like.

The co-crosslinking agent includes an unsaturated carboxylic acid and a metal salt thereof.

Typical examples of the unsaturated carboxylic acid include acrylic acid, methacrylic acid, maleic acid, and fumaric acid. Of these examples, acrylic acid and methacrylic acid are desirable.

The metal salt of unsaturated carboxylic acid is not specifically restricted. It is obtained by neutralizing the above-mentioned unsaturated carboxylic acid with metal ions. Typical examples include zinc salt or magnesium salt of acrylic acid or methacrylic acid. Of these examples, zinc acrylate is desirable.

The unsaturated carboxylic acid and/or the salt thereof may be compounded into 100 pbw of the base rubber in an amount no less than 10 pbw, preferably no less than 15 pbw, more preferably no less than 20 pbw, and no more than 60 pbw, preferably no more than 50 pbw, more preferably no more than 45 pbw, most desirably no more than 40 pbw. With an amount exceeding the upper limit, it makes the golf ball too hard to give comfortable feeling. With an amount shorter than the lower limit, it makes the golf ball poor in rebound resilience.

The organic peroxide may be selected from commercial products, such as Percumyl D and Perhexa 3M (both from NOF) and Luperco 231XL (from Atochem). They may be used alone or in combination with one another.

The organic peroxide may be compounded into 100 pbw of the base rubber in an amount no less than 0.1 pbw, preferably no less than 0.3 pbw, more preferably no less than 0.5 pbw, most desirably no less than 0.7 pbw, and no more than 5 pbw, preferably no more than 4 pbw, more preferably no more than 3 pbw, most desirably no more than 2 pbw. With an excessively large or small amount, it makes the golf ball poor in feeling, durability, and rebound resilience.

The inert filler includes zinc oxide, barium sulfate, calcium carbonate, and the like. They may be used alone or in combination with one another.

The inert filler may be compounded into 100 pbw of the base rubber in an amount no less than 5 pbw, preferably no less than 7 pbw, and no more than 50 pbw, preferably no more than 40 pbw, more preferably no more than 30 pbw, most desirably no more than 20 pbw. With an excessively large or small amount, it makes the golf ball poor in rebound resilience or it makes the golf ball deviate from the specified weight.

The rubber compound may be compounded with an antioxidant according to need. The antioxidant may be selected from commercial products, such as Nocrack NS-6 and Nocrack NS-30 (both from Ouchi-shinko Kagaku) and Yoshinox 425 (from API Corporation). They may be used alone or in combination with one another.

The antioxidant may be compounded into 100 pbw of the base rubber in an amount no less than 0 pbw, preferably no less than 0.05 pbw, more preferably no less than 0.1 pbw, most desirably no less than 0.2 pbw, and no more than 3 pbw, preferably no more than 2 pbw, more preferably no more than 1 pbw, most desirably no more than 0.5 pbw. With an excessively large or small amount, it makes the golf ball poor in durability and rebound resilience.

The core should preferably be compounded with an organic sulfur compound so that the golf ball has improved rebound resilience and exhibits a large initial velocity.

The organic sulfur compound is not specifically restricted so long as it improves the rebound resilience of the golf ball. It includes thiophenols, thionaphthols, halogenated thiophenols, and metal salt thereof. Its typical examples include pentachlorothiophenol, pentafluorothiophenol, pentabromothiophenol, parachlorothiophenol, zinc salt of pentachlorothiophenol, zinc salt of pentafluorothiophenol, zinc salt of pentabromothiophenol, zinc salt of parachlorothiophenol, diphenylpolysulfide having 2 to 4 sulfur atoms, dibenzylpolysulfide, dibenzoylsulfide, dibenzothiazoylpolysulfide, and dithiobenzoylpolysulfide. Specifically, zinc salt of pentachlorothiophenol and diphenyldisulfide are preferably used.

The organic sulfur compound may be compounded into 100 pbw of the base rubber in an amount no less than 0.05 pbw, preferably no less than 0.1 pbw, and no more than 5 pbw, preferably no more than 4 pbw, more preferably no more than 3 pbw, most desirably no more than 2.5 pbw. With an excessively large amount, its effect may be plateaued. With an excessively small amount, it does not fully produce its effect.

The core should have a diameter no smaller than 36.5 mm, preferably no smaller than 37.0 mm, and no larger than 38.5 mm, preferably no larger than 38.2 mm. The weight of the core should be 30 to 36 g, preferably 31 to 34 g.

According to the present invention, the core should have a diameter specified above and an adequate hardness such that it deforms 2.6 mm or more, preferably 2.7 mm or more, particularly 2.8 mm to 3.2 mm, preferably 3.1 mm or less, most desirably 4.0 mm or less, under a load which changes from 10 kg to 130 kg. An excessively hard core makes the golf ball poor in feeling and flying performance. Poor flying performance is due to excessive spin that occurs at the time of long shot with a driver which greatly deforms the golf ball. An excessively soft core makes the golf ball poor in feeling and rebound resilience and hence in flight performance. It also makes the golf ball poor in durability for repeated hitting.

The difference in hardness between the core surface and the core center should be no smaller than 10, preferably no smaller than 13, more preferably no smaller than 21, and no larger than 40, preferably no larger than 35. If this difference is excessively small, the resulting golf ball will undergo excessive spin at the time of driver shot, which leads to a high projectile and a short flying performance. If this difference is excessively large, the resulting golf ball will be poor in flying performance owing to very little rebound resilience.

Incidentally, the surface hardness of the core should be no lower than 60, preferably no lower than 65, and no higher than 95, preferably no higher than 90.

The hardness of the core surface is measured by applying a JIS-C hardness meter directly to the core surface. The hardness of the core center is measured by applying a JIS-C hardness meter to the center of the cross section that halves the core. The hardness is expressed as an average value of four measurements for each of ten samples. (The same shall apply hereinafter.)

The core may be produced from a rubber compound containing the above-mentioned components by curing in any known manner. The process for production consists of mixing the rubber compound in a mixing machine (such as Banbury mixer and roll mill), compression molding or injection molding the mixed rubber compound in a mold, and curing the molded product at an adequate temperature, which is high enough for the organic peroxide and co-crosslinking agent to work as desired. If the organic peroxide is dicumyl peroxide and the co-crosslinking agent is zinc acrylate, the curing temperature should be 130 to 170° C., preferably 150 to 160° C., and the curing time should be 12 to 20 minutes.

The core deformation and hardness may be adjusted to the above-mentioned range by adequately selecting the materials and additives (such as organic peroxide and co-crosslinking agent) and their amounts and the curing conditions.

The intermediate layer may be formed such that its surface hardness is 64 to 70, preferably 65 to 69, particularly 66 to 68, in terms of Shore D hardness. An excessively soft intermediate layer causes the golf ball to spin more than necessary at the time of hitting, which leads to a short flying distance. It also makes the golf ball impart an excessively soft feeling. An excessively hard intermediate layer will make the golf ball poor in controllability due to an excessively small amount of spin and also in durability for repeated hitting. It also makes the golf ball impart an excessively hard feeling. Incidentally, the surface hardness is measured by applying a Shore D hardness meter directly to the surface of the intermediate layer enclosing the core.

The intermediate layer may be formed from any material that gives the Shore D hardness specified above. A preferred material is a thermoplastic resin, particularly an ionomer resin.

In this case, the ionomer resin should preferably account for no less than 70 wt %, particularly no less than 80 wt %, of the intermediate layer. Moreover, the ionomer resin should preferably be compounded with a ternary composite material composed of a rubber component, a polyolefin component, and a polyamide component, so that the golf ball is improved in resistance to cracking caused by repeated hitting. The ternary composite material is constructed such that fine polyamide fibers are uniformly dispersed in a matrix formed from rubber and polyolefin. It is commercially available under a trade name of LA1060 (from Daiwa Polymer). The amount of the composite material should be 1 to 20 wt %, preferably 2 to 10 wt %.

The ionomer resin should preferably be one which is neutralized with lithium ions from the viewpoint of rebound resilience and resistance to cracking caused by repeated hitting. It is commercially available from DuPont under a trade name of Surlyn 7930 or Surlyn 7940.

The material for the intermediate layer may be compounded with various additives according to need. The additives include pigment, dispersing agent, antioxidant, UV absorber, and light stabilizer. Typical examples of the additives include inorganic filler such as zinc oxide, barium sulfate, and titanium dioxide.

The cover layer is formed mainly from thermoplastic polyurethane, so that it exhibits good scratch resistance and contributes to spin stability during flight.

The thermoplastic polyurethane is not specifically restricted so long as it is a thermoplastic elastomer composed mainly of polyurethane. It should preferably be one in which the soft segment is composed of high-molecular-weight polyol compound and the hard segment is composed of chain extender and diisocyanate.

The high-molecular-weight polyol compound is not specifically restricted. It may be selected from those which have conventionally been used in the field of thermoplastic polyurethane. Its typical examples include polyester polyol, polyether polyol, copolyester polyol, and polycarbonate polyol. Of these examples, polyether polyol and polyester polyol are desirable. The former is suitable for thermoplastic polyurethane excellent in rebound resilience and low-temperature properties, and the latter is suitable for thermoplastic polyurethane excellent in heat resistance and permits a broad range of molecular design.

The polyester polyol includes polycaprolacton glycol, poly(ethylene-1,4-adipate) glycol, and poly(butylenes-1,4-adipate) glycol.

The polyether polyol includes polytetramethylene glycol and polypropylene glycol, with the former being preferable.

The copolyester polyol includes poly(diethylene glycol adipate) glycol.

The polycarbonate polyol includes poly(hexanediol-1,6-carbonate) glycol.

These high-molecular-weight polyol compounds should have a number-average molecular weight no lower than 500, preferably no lower than 1000, more preferably no lower than 2000, and no higher than 5000, preferably no higher than 4000, and more preferably no higher than 3000.

Incidentally, the number-average molecular weight is one which is measured by GPC method and is expressed in terms of polystyrene.

The diisocyanate is not specifically restricted. It may be selected from those which have conventionally been used in the field of thermoplastic polyurethane. It includes, for example, 4,4'-diphenylmethanediisocyanate, 2,4-toluenediisocyanate, 2,6-toluenediisocyanate, hexamethylenediisocyanate, 2,2,4(2,4,4)-trimethylhexamethylenediisocyanate, lysinediisocyanate, and tolylenediisocyanate.

Of the examples listed above, 4,4'-diphenylmethanediisocyanate is desirable from the standpoint of miscibility with the isocyanate mixture mentioned later. There are some isocyanates which prevent adequate control of crosslinking reaction during injection molding.

The chain extender is not specifically restricted. It may be selected from those which have conventionally been used in the field of thermoplastic polyurethane such as conventional polyhydric alcohol and amines. It includes, for example, 1,4-butylene glycol, 1,2-ethylene glycol, 1,3-butanediol, 1,6-hexanediol, 2,2,-diemthyl-1,3-propanediol, dicyclohexylmethylmethanediamine (hydrogenated MDI), and isophoronediamine (IPDA).

The chain extender should be one which has a number-average molecular weight no lower than 20 and no higher than 15,000.

The thermoplastic polyurethane is not specifically restricted in specific gravity. Its specific gravity may range from 1.0 to 1.3, preferably from 1.1 to 1.25, depending on the desired properties.

The thermoplastic polyurethane may be selected from commercial products, such as Pandex T8290, T8295, and T8260 (from DIC-Bayer Polymer) and Resamin 2593 and 2597 (from Dainichiseika).

The cover layer may be formed from either the above-mentioned thermoplastic polyurethane alone or a thermoplastic polyurethane composition composed of the above-mentioned thermoplastic polyurethane (A) and an isocyanate mixture (B).

The isocyanate mixture (B) should preferably be one which is composed of (b-1) a compound having two or more isocyanate groups (as functional groups) in one molecule and (b-2) a thermoplastic resin which does not essentially react with isocyanate, with the former being dispersed in the latter.

The compound designated as (b-1) may be selected from isocyanate compounds which have conventionally been used in the field of polyurethane. It includes, for example, aromatic isocyanate compounds, hydrogenated aromatic isocyanate compounds, aliphatic isocyanates, and alicyclic diisocyanates.

The aromatic isocyanate compounds include, for example, 2,4-toluenediisocyanate, 2,6-toluenediisocyanate, a mixture of the foregoing two compounds, 4,4'-diphenylmethanediisocyanate, m-phenylenediisocyanate, and 4,4'-biphenyldiisocyanate.

The hydrogenated aromatic isocyanate compound includes, for example, dicyclohexylmethanediisocyanate.

The aliphatic diisocyanate includes, for example, tetramethylenediisocyanate, hexametylenediisocyanate, and octamethylenediisocyanate.

The alicyclic diisocyanate includes, for example, isophoronediisocyanate.

Of the examples mentioned above, 4,4'-diphenylmethanediisocyanate is desirable from the standpoint of reactivity and safety in working.

The thermoplastic resin designated as (b-2) above should preferably be one which is low in water absorption and excellent in miscibility with thermoplastic polyurethane material. Its examples include, for example, polystyrene resin, polyvinyl chloride resin, ABS resin, polycarbonate resin, polyester thermoplastic elastomer (e.g., polyether-ester block copolymer and polyester-ester block copolymer). They are not limitative.

Of these examples, polyester thermoplastic elastomer is desirable from the standpoint of rebound resilience and strength. The polyester thermoplastic elastomer is not specifically restricted so long as it is one which is composed mainly of polyester. A polyester-based block copolymer is desirable which is composed mainly of a segment of high-melting crystalline polymer consisting of crystalline aromatic polyester units and a segment of low-melting polymer consisting of aliphatic polyether units and/or aliphatic polyester units.

The segment of high-melting crystalline polymer consisting of crystalline aromatic polyester units is polybutylene terephthalate or the like which is derived from terephthalic acid and/or dimethyl terephthalate and 1,4-butanediol. It also includes polyesters which are derived from a dicarboxylic acid and a diol. The dicarboxylic acid includes isophthalic acid, phthalic acid, naphthalene-2,6-dicarboxylic acid, naphthalene-2,7-dicarboxylic acid, diphenyl-4,4'-dicarboxylc acid, diphenoxyethane dicarboxylic acid, 5-sulfoisophthalic acid, and their ester-forming derivatives. The diol includes aliphatic diols having a molecular weight lower than 300, such as ethylene glycol, trimethylene glycol, pentamethylene glycol, hexamethylene glycol, neopentyl glycol, and decamethylene-glycol; alicyclic diols, such as 1,4-cyclohexanedimethanol and tricyclodecanedimethylol; and aromatic diols, such as xylene glycol, bis(p-hydroxy)diphenyl, bis(p-hydroxyphenyl)propane, 2,2-bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quaterphenyl. They are not limitative. Two or more dicarboxylic acid components and two or more diol components may be used to form copolymer polyesters.

The polyester may be copolymerized with multifunctional carboxylic acid components, multifunctional oxy components, and multifunctional hydroxy components in an amount less than 5 mol %.

The low-melting polymer consisting of aliphatic polyether units and/or aliphatic polyester units may be one in which the aliphatic polyether is any of poly(ethyleneoxide)glycol, poly(propyleneoxide)glycol, poly(tetramethyleneoxide)glycol, poly(hexamethyleneoxide)glycol, ethylene oxide-propylene oxide copolymer, poly(propyleneoxide)glycol-ethylene oxide adduct polymer, and ethylene oxide-tetrahydrofuran copolymer, and the aliphatic polyester is any of poly($\epsilon$-caprolacton), polyenantholacton, polycaprolacton, polybutylene adipate, and polyethylene adipate.

The low-melting polymer segment should preferably be one which has a number-average molecular weight of about 300 to 6000 in the copolymerized state.

It was mentioned above that the polyester thermoplastic elastomer is composed mainly of two segments, one segment being a high-melting crystalline polymer consisting of crystalline aromatic polyester units, and the other segment being a low-melting polymer consisting of aliphatic polyether units and/or aliphatic polyester units. The amount of the two segments should be adjusted such that the second segment accounts for no less than 15 wt %, preferably no less than 50 wt %, and no more than 90 wt % in the total amount of the copolymer. With the second segment in an excessively large amount, the resulting thermoplastic copolymer does not exhibit the desirable melting characteristics but present difficulties in uniform mixing (by melt blending) with other components. With the second segment in an excessively small amount, the resulting thermoplastic copolymer is poor in flexibility and rebound resilience.

The polyester thermoplastic elastomer suitable for use in the present invention is commercially available under a trade name of "Hytrel" (from Toray-DuPont) and "Primaloy" (from Mitsubishi Kagaku).

In production of the isocyanate mixture (B), the ratio of the component (b-1) to the component (b-2) should preferably be such that (b-1)/(b-2)=from 100/5 to 100/100, particularly from 100/10 to 100/40 (by weight). If the amount of (b-1) is excessively small relative to (b-2), it is necessary to add a large amount of the isocyanate mixture (B) for sufficient crosslinking of the thermoplastic polyurethane (A). An excessively large amount of (b-2) adversely affects the properties of the thermoplastic polyurethane composition as the cover material. An excessively large amount of (b-1) causes slipping during mixing, making it difficult to prepare the thermoplastic polyurethane as the cover material.

The isocyanate mixture (B) is obtained by thoroughly mixing a mixture of components (b-1) and (b-2) at 130-250° C. in a mixing roll or Banbury mixer, followed by pelletizing or crushing after cooling.

The isocyanate mixture (B) may be selected from commercial products, such as "Crossnate EM30" (from Dainichiseika).

The amount of the component (B) based on 100 pbw of the component (A) should be no less than 1 pbw, preferably no less than 5 pbw, more preferably no less than 10 pbw, and no less than 100 pbw, preferably no less than 50 pbw, more preferably no less than 30 pbw. With an excessively small amount, the resulting composition is poor in characteristic properties due to incomplete crosslinking. With an excessively Large amount, the resulting composition is subject to discoloration due to heat, UV light, and time, or decrease in rebound resilience.

The cover material according to the present invention may optionally be compounded with various additives in addition to the above-mentioned resin components. Such additives include pigment, dispersing agent, antioxidant, UV light absorber, UV light stabilizer, mold release, plasticizer, and inorganic filler (such as zinc oxide, barium sulfate, and titanium dioxide).

The amount of these additives is not limited so long as it has no adverse effect on the purpose of the present invention. The amount based on 100 pbw of the thermoplastic polyurethane (as the essential component) should be no less than 0.1 pbw, preferably no less than 0.5 pbw, and no more than 10 pbw, preferably no more than 5 pbw.

The thermoplastic polyurethane according to the present invention may be formed into the cover layer by injection molding, such that the cover layer encloses the intermediate layer enclosing the core. The molding temperature is usually 150 to 250° C.

The golf ball according to the present invention may have an adhesive that binds together the intermediate layer and the cover layer for improvement in durability for hitting. Any adhesive may be used so long as it has no adverse effect on the purpose of the present invention. Typical examples of the adhesive include chlorinated polyolefin adhesive (RB18 primer, from Nippoin B-Chemical), urethane resin adhesive (Resamin D6208, from Dainichiseika), epoxy resin adhesive, vinyl resin adhesive, and rubber adhesive. The thickness of the adhesive should preferably be 0.1 to 30 μm, although it is not specifically restricted. It is not always necessary to coat the intermediate layer completely. The adhesive may be omitted if the intermediate layer is compounded with a proper amount of trimethylolpropane.

The surface hardness of the cover layer (formed on the intermediate layer) should be 58 to 64, preferably 59 to 63, more preferably 59 to 62. It is measured by applying a Shore D hardness meter directly to the cover layer. The cover layer with an excessively low hardness will cause excessive spin which reduces flying distance. The cover layer with an excessively high hardness will make the golf ball poor in controllability due to an excessively small amount of spin and also in crack resistance and scratch resistance and aggravate short game and putter feeling.

According to the present invention, the cover layer should be softer than the intermediate layer such that the difference between the hardness of the cover layer and the hardness of the intermediate layer is 4 to 10, particularly 5 to 9, in terms of Shore D hardness. If this difference is excessively large, the resulting golf ball will be poor in scratch resistance and durability for repeated hitting and also in short game feeling and spin stability at the time of flier. If this difference is excessively small, the resulting golf ball will be subject to excessive spin and poor in rebound resilience and flying distance.

According to the present invention, the total thickness of the intermediate layer and the cover layer should be 2.2 to 3.0 mm, particularly 2.4 to 2.8 mm.

If the total thickness is excessively small, the resulting golf ball will be poor in durability for repeated hitting. If the total thickness is excessively large, the resulting golf ball is poor in rebound resilience and flying distance due to increased spin, particularly at the time of driver shot.

The thickness of the cover layer should be 0.8 to 1.3 mm, particularly 0.9 to 1.2 mm. If the cover layer is excessively thick, the resulting golf ball will be poor in flying distance due to increased spin at the time of long shot with a driver which greatly deforms the golf ball. If the cover layer is excessively thin, the resulting golf ball will be poor in short game feeling and spin stability at the time of flier.

The golf ball according to the present invention has a large number of dimples formed in the surface of the cover layer. The number of dimples should be 250 to 390, particularly 300 to 370, which is adequate for lift and increased flying distance by a driver. The dimples should preferably be flat and round, with the diameter being 2 to 6 mm, particularly 2.5 to 5.0 mm, and the depth being 0.05 to 0.30 mm. The average depth should be 0.125 to 0.150 mm so that the golf ball flies along an adequate projectile. The dimples should vary in diameter and/or depth from each other, with the number of varieties being 4 to 6, so that the dimples cover the maximum surface area of the ball.

The average depth of dimples means the average value of depth of all dimples. The diameter of the dimple is the maximum distance between lands (where no dimples are made). If the golf ball has coating, the diameter of the dimple is that of the coated dimple. The depth of the dimple is the vertical distance between the center of a hypothetical flat surface connecting the land of the dimple and the bottom of the dimple.

The three-piece solid golf ball of the present invention may be finished with coating, surface treatment, and marking.

It should conform to the Golf Rules for competition. It should have a diameter of 42.60 to 42.80 mm and a weight of 45.0 to 45.93 g.

EXAMPLES

The invention will be described in more detail with reference to the following Examples and Comparative Examples, which are not intended to restrict the scope thereof.

Examples and Comparative Examples

Cores were prepared in the usual way from the materials and by the curing method specified in Tables 1 and 2. Each of the cores was enclosed by an intermediate layer and a cover layer by injection molding with the materials (A to K) specified in Table 3. Dimples as specified in Tables 1 and 2 were uniformly formed in the surface of the cover layer simultaneously with injection molding.

The resulting golf balls were tested for flying distance, approach spin, feeling, and durability. The results are shown in Tables 1 and 2.

The following methods were used to measure the amount of core deformation, the difference in hardness between the center of the core and the surface of the core, and the hardness of the intermediate layer and the cover layer. Incidentally, all measurements were carried out at an ambient temperature of 23° C.

Amount of Core Deformation

Deformation (in mm) which the golf ball experiences under the load that increases from 10 kg (98 N) to 130 kg (1274 N).

Difference in Dore Hardness

The hardness of the core surface is measured by applying a JIS-C hardness meter directly to the core surface. The hardness of the core center is measured by applying a JIS-C hardness meter to the center of the cross section that halves the core.

Surface Hardness of Intermediate Layer

The hardness of the surface of the intermediate layer is measured by applying a Shore D hardness meter to the surface of the intermediate layer enclosing the core.

Surface Hardness of Cover Laver

The hardness of the surface of the cover layer is measured by applying a Shore D hardness meter to the surface of the cover layer enclosing the intermediate layer. (Measurement is made at the part where no dimples are formed.)

The golf balls were tested for their performance by the following method.

Flying Performance

Flying distance is the distance covered by the golf ball hit by a driver (W#1) at an initial head speed (HS) of 50 m/s. The results are rated as follows.

◯: 255 m and more

X: less than 255 m

Approach Spin

Approach spin is the spin which the golf ball experiences when hit by a sand wedge (SW) at an HS of 20 m/s. The results are rated as follows.

◯: 6000 rpm and up

X: less than 6000 rpm

Feeling

Feeling was evaluated by three top amature golfers for sensory test. The results are rated as follows.

◯: good feeling

X: too hard or too soft

Durability for Repeated Hitting

Durability is expressed in terms of the number of consecutive hits (by W#1 at an HS of 50 m/s) required for the golf ball to become degraded to such an extent the ball invariably shows a decrease in rebound resilience by 3%. Durability in Example 1 is regarded as 100. The results are rated as follows.

◯: 100 and above

X: less than 95

Scratch Resistance

Evaluated by observing the ball which has been hit by a pitching wedge (PW) at an HS of 35 m/s. The results are rated as follows.

◯: still usable

X: not usable

Durability for Topping by Iron

Evaluated by observing the ball which has been hit by a pitching wedge (PW) at an HS of 37 m/s. The results are rated as follows.

◯: still usable

X: not usable

TABLE 1

|  |  | Example | | | | |
|---|---|---|---|---|---|---|
|  |  | 1 | 2 | 3 | 4 | 5 |
| Formulation of core (pbw) | Polybutadiene *1 | 100 | 100 | 100 | 100 | 100 |
|  | Isoprene rubber *2 | 0 | 0 | 0 | 0 | 0 |
|  | Sulfur | 0 | 0 | 0 | 0 | 0 |
|  | Zinc acrylate | 28.5 | 28.5 | 29.0 | 28.5 | 27.5 |
|  | Peroxide (1) *3 | 0.3 | 0.3 | 0.3 | 0.3 | 0.3 |
|  | Peroxide (2) *4 | 0.3 | 0.3 | 0.3 | 0.3 | 0.3 |
|  | Antioxidant *5 | 0.1 | 0.1 | 0.1 | 0.1 | 0.1 |
|  | Zinc oxide | 23.3 | 23.3 | 23.0 | 23.3 | 23.8 |
|  | Zinc salt of pentachlorophenol | 0.1 | 0.1 | 0.3 | 0.1 | 0 |
|  | Zinc stearate | 5 | 5 | 5 | 5 | 5 |
| Vulcanizing method | Temperature (° C.) | 157 | 157 | 157 | 157 | 157 |
|  | Time (minutes) | 15 | 15 | 15 | 15 | 15 |
| Core | Outside diameter (mm) | 37.3 | 37.3 | 37.3 | 37.6 | 37.3 |
|  | Amount of deflection (mm), from 10 Kg to 130 Kg | 3.0 | 3.0 | 3.0 | 3.0 | 2.6 |
|  | Difference in core hardness (surface-center), JIS-C | 14 | 14 | 14 | 14 | 13 |
| Intermediate layer | Material of intermediate layer | A | A | B | A | A |
|  | Surface hardness (Shore D) | 68 | 68 | 65 | 68 | 68 |
|  | Outside diameter (mm) *6 | 40.6 | 40.6 | 40.6 | 40.9 | 40.6 |
|  | Thickness (mm) | 1.65 | 1.65 | 1.65 | 1.65 | 1.65 |
| Presence or absence of adhesive between intermediate layer and cover layer *7 | | Yes | Yes | Yes | Yes | Yes |
| Cover layer | Kind of material for cover layer | G | H | H | H | H |
|  | Thickness of cover layer (mm) | 1.04 | 1.04 | 1.04 | 0.89 | 1.04 |
|  | Surface hardness of cover layer (Shore D) | 60.5 | 59 | 58.5 | 59 | 59 |
| Ball | Outside diameter (mm) | 42.7 | 42.7 | 42.7 | 42.7 | 42.7 |
|  | Weight (g) | 45.6 | 45.6 | 45.6 | 45.6 | 45.6 |
| Dimples | Number of dimples | 330 | 330 | 330 | 330 | 330 |
|  | Average depth of dimples (mm) | 0.136 | 0.136 | 0.136 | 0.136 | 0.136 |
|  | Kind of dimples | 5 | 5 | 5 | 5 | 5 |
| Difference in surface hardness (Shore D), Intermediate layer) − (Cover layer) | | 7.5 | 9.0 | 6.5 | 9.0 | 9.0 |
| (Thickness of cover layer) + (Thickness of intermediate layer) (mm) | | 2.69 | 2.69 | 2.69 | 2.54 | 2.69 |
| Flight | W#1 Carry (m) | 239.5 | 239.0 | 237.9 | 239.3 | 239.9 |
|  | HS45 Total (m) | 257.7 | 256.6 | 255.6 | 256.8 | 258.1 |
|  | Spin (rpm) | 2,650 | 2,700 | 2,720 | 2,680 | 2,820 |
|  | Rating | ○ | ○ | ○ | ○ | ○ |
| Approach spin | SW:HS 16 m/s, spin (rpm) | 6,030 | 6,270 | 6,310 | 6,210 | 6,440 |
|  | Rating | ○ | ○ | ○ | ○ | ○ |
| Feeling | W#1 | ○ | ○ | ○ | ○ | ○ |
|  | Putter | ○ | ○ | ○ | ○ | ○ |
| Durability | Durability for rebound resilience to decrease after repeated hitting | ○ | ○ | ○ | ○ | ○ |
|  | Resistance to scratches | ○ | ○ | ○ | ○ | ○ |
|  | Durability in topping by iron | ○ | ○ | ○ | ○ | ○ |

|  |  | Example | | | | |
|---|---|---|---|---|---|---|
|  |  | 6 | 7 | 8 | 9 | 10 |
| Formulation of core (pbw) | Polybutadiene *1 | 100 | 100 | 100 | 90 | 100 |
|  | Isoprene rubber *2 | 0 | 0 | 0 | 10 | 0 |
|  | Sulfur | 0 | 0 | 0 | 0.1 | 0 |
|  | Zinc acrylate | 28.5 | 28.5 | 28.5 | 36.0 | 28.5 |
|  | Peroxide (1) *3 | 0.3 | 0.3 | 0.3 | 1.2 | 0.3 |
|  | Peroxide (2) *4 | 0.3 | 0.3 | 0.3 | 1.2 | 0.3 |
|  | Antioxidant *5 | 0.1 | 0.1 | 0.1 | 0.1 | 0.1 |
|  | Zinc oxide | 23.3 | 23.3 | 23.3 | 18.4 | 23.3 |
|  | Zinc salt of pentachlorophenol | 0.1 | 0.1 | 0.1 | 2.5 | 0.1 |
|  | Zinc stearate | 5 | 5 | 5 | 5 | 5 |

TABLE 1-continued

| | | | | | | |
|---|---|---|---|---|---|---|
| Vulcanizing method | Temperature (° C.) | 157 | 157 | 157 | 170 | 157 |
| | Time (minutes) | 15 | 15 | 15 | 17 | 15 |
| Core | Outside diameter (mm) | 37.3 | 37.3 | 37.3 | 37.3 | 37.3 |
| | Amount of deflection (mm), from 10 Kg to 130 Kg | 3.0 | 3.0 | 3.0 | 3.0 | 3.0 |
| | Difference in core hardness (surface-center), JIS-C | 14 | 14 | 14 | 24 | 14 |
| Intermediate layer | Material of intermediate layer | C | D | E | A | A |
| | Surface hardness (Shore D) | 67 | 67.5 | 68 | 68 | 68 |
| | Outside diameter (mm) *6 | 40.6 | 40.6 | 40.6 | 40.6 | 40.6 |
| | Thickness (mm) | 1.65 | 1.65 | 1.65 | 1.68 | 1.68 |
| Presence or absence of adhesive between intermediate layer and cover layer *7 | | Yes | Yes | No | Yes | Yes |
| Cover layer | Kind of material for cover layer | H | H | H | H | H |
| | Thickness of cover layer (mm) | 1.04 | 1.04 | 1.04 | 1.04 | 1.04 |
| | Surface hardness of cover layer (Shore D) | 59 | 59 | 59 | 59 | 59 |
| Ball | Outside diameter (mm) | 42.7 | 42.7 | 42.7 | 42.7 | 42.7 |
| | Weight (g) | 45.6 | 45.6 | 45.6 | 45.6 | 45.6 |
| Dimples | Number of dimples | 330 | 330 | 330 | 330 | 368 |
| | Average depth of dimples (mm) | 0.136 | 0.136 | 0.136 | 0.136 | 0.133 |
| | Kind of dimples | 5 | 5 | 5 | 5 | 4 |
| Difference in surface hardness (Shore D), Intermediate layer) – (Cover layer) | | 8.0 | 8.5 | 9.0 | 9.0 | 9.0 |
| (Thickness of cover layer) + Thickness of intermediate layer) (mm) | | 2.69 | 2.69 | 2.69 | 2.72 | 2.72 |
| Flight | W#1 Carry (m) | 238.1 | 238.7 | 238.7 | 238.8 | 239.2 |
| | HS45 Total (m) | 256.1 | 256.6 | 256.5 | 257.7 | 256.1 |
| | Spin (rpm) | 2,720 | 2,690 | 2,730 | 2,640 | 2,710 |
| | Rating | ○ | ○ | ○ | ○ | ○ |
| Approach spin | SW:HS 16 m/s, spin (rpm) | 6,300 | 6,250 | 6,290 | 6,230 | 6,300 |
| | Rating | ○ | ○ | ○ | ○ | ○ |
| Feeling | W#1 | ○ | ○ | ○ | ○ | ○ |
| | Putter | ○ | ○ | ○ | ○ | ○ |
| Durability | Durability for rebound resilience to decrease after repeated hitting | ○ | ○ | ○ | ○ | ○ |
| | Resistance to scratches | ○ | ○ | ○ | ○ | ○ |
| | Durability in topping by iron | ○ | ○ | ○ | ○ | ○ |

TABLE 2

| | | Comparative Example | | | | | |
|---|---|---|---|---|---|---|---|
| | | 1 | 2 | 3 | 4 | 5 | 6 |
| Formulation of core (pbw) | Polybutadiene *1 | 100 | 100 | 100 | 100 | 100 | 100 |
| | Isoprene rubber *2 | 0 | 0 | 0 | 0 | 0 | 0 |
| | Sulfur | 0 | 0 | 0 | 0 | 0 | 0 |
| | Zinc acrylate | 27.5 | 29 | 27.5 | 28.5 | 28.5 | 28.5 |
| | Peroxide (1) *3 | 0.3 | 0.3 | 0.3 | 0.3 | 0.3 | 0.3 |
| | Peroxide (2) *4 | 0.3 | 0.3 | 0.3 | 0.3 | 0.3 | 0.3 |
| | Antioxidant *5 | 0.1 | 0.1 | 0.1 | 0.1 | 0.1 | 0.1 |
| | Zinc oxide | 23.8 | 23 | 26.8 | 19.1 | 21.6 | 23.4 |
| | Zinc salt of pentachlorophenol | 0 | 0.3 | 0.1 | 0.1 | 0.6 | 0 |
| | Zinc stearate | 5 | 5 | 5 | 5 | 5 | 5 |
| Vulcanizing method | Temperature (° C.) | 157 | 157 | 157 | 157 | 157 | 157 |
| | Time (minutes) | 15 | 15 | 15 | 15 | 15 | 15 |
| Core | Outside diameter (mm) | 37.3 | 37.3 | 36.4 | 38.6 | 36.8 | 37.9 |
| | Amount of deflection (mm), from 10 Kg to 130 Kg | 3.1 | 3.0 | 3.2 | 3.0 | 3.2 | 2.9 |
| | Difference in core hardness (surface-center), JIS-C | 14 | 14 | 14 | 14 | 14 | 14 |
| Intermediate layer | Material of intermediate layer | F | B | A | A | A | A |
| | Surface hardness (Shore D) | 71 | 65 | 68 | 68 | 68 | 68 |
| | Outside diameter (mm) *6 | 40.6 | 40.6 | 40.6 | 40.6 | 39.7 | 41.2 |
| | Thickness (mm) | 1.65 | 1.65 | 2.10 | 1.00 | 1.45 | 1.65 |

TABLE 2-continued

| | | | | | | | |
|---|---|---|---|---|---|---|---|
| Presence or absence of adhesive between intermediate layer and cover layer *7 | | Yes | Yes | Yes | Yes | Yes | Yes |
| Cover layer | Kind of material for cover layer | H | I | H | H | H | H |
| | Thickness of cover layer (mm) | 1.04 | 1.04 | 1.04 | 1.04 | 1.49 | 0.74 |
| | Surface hardness of cover layer (Shore D) | 59.5 | 61.5 | 59 | 59 | 58.5 | 59.5 |
| Ball | Outside diameter (mm) | 42.7 | 42.7 | 42.7 | 42.7 | 42.7 | 42.7 |
| | Weight (g) | 45.6 | 45.6 | 45.6 | 45.6 | 45.6 | 45.6 |
| Dimples | Number of dimples | 330 | 330 | 330 | 330 | 330 | 330 |
| | Average depth of dimples (mm) | 0.136 | 0.136 | 0.136 | 0.136 | 0.136 | 0.136 |
| | Kind of dimples | 5 | 5 | 5 | 5 | 5 | 5 |
| Difference in surface hardness (Shore D), (Intermediate layer) − (Cover layer) | | 11.5 | 3.5 | 9.0 | 9.0 | 9.5 | 8.5 |
| (Thickness of cover layer) + (Thickness of intermediate layer) (mm) | | 2.69 | 2.69 | 3.14 | 2.04 | 2.94 | 2.39 |
| Flight | W#1 Carry (m) | 239.5 | 238.5 | 237.1 | 239.3 | 237.1 | 239.2 |
| | HS45 Total (m) | 257.9 | 257.3 | 254.4 | 257.0 | 253.9 | 257.2 |
| | Spin (rpm) | 2,610 | 2,630 | 2,780 | 2,690 | 2,790 | 2,680 |
| | Rating | ○ | ○ | X | ○ | X | ○ |
| Approach spin | SW:HS 16 m/s, spin (rpm) | 6,190 | 5,940 | 6,220 | 6,260 | 6,430 | 6,190 |
| | Rating | ○ | X | ○ | ○ | ○ | ○ |
| Feeling | W#1 | ○ | ○ | ○ | ○ | ○ | ○ |
| | Putter | ○ | ○ | X | ○ | ○ | X |
| Durability | Durability for rebound resilience to decrease after repeated hitting | ○ | ○ | ○ | X | ○ | X |
| | Resistance to scratches | X | ○ | ○ | X | ○ | X |
| | Durability in topping by iron | ○ | ○ | ○ | ○ | ○ | X |

| | | Comparative Example | | | | | |
|---|---|---|---|---|---|---|---|
| | | 7 | 8 | 9 | 10 | 11 | 12 |
| Formulation of core (pbw) | Polybutadiene *1 | 100 | 100 | 100 | 100 | 100 | 100 |
| | Isoprene rubber *2 | 0 | 0 | 0 | 0 | 0 | 0 |
| | Sulfur | 0 | 0 | 0 | 0 | 0 | 0 |
| | Zinc acrylate | 29 | 29 | 27.5 | 28.5 | 28.5 | 28.5 |
| | Peroxide (1) *3 | 0.3 | 0.3 | 0.5 | 0.3 | 0.3 | 0.3 |
| | Peroxide (2) *4 | 0.3 | 0.3 | 0.5 | 0.3 | 0.3 | 0.3 |
| | Antioxidant *5 | 0.1 | 0.1 | 0.2 | 0.1 | 0.1 | 0.1 |
| | Zinc oxide | 23 | 29.8 | 23.8 | 23.2 | 23.3 | 23.3 |
| | Zinc salt of pentachlorophenol | 0.1 | 0.6 | 0 | 0.3 | 0.1 | 0.1 |
| | Zinc stearate | 5 | 5 | 5 | 5 | 5 | 5 |
| Vulcanizing method | Temperature (° C.) | 157 | 157 | 157 | 157 | 157 | 157 |
| | Time (minutes) | 15 | 15 | 15 | 15 | 15 | 15 |
| Core | Outside diameter (mm) | 37.3 | 37.3 | 37.3 | 37.3 | 37.3 | 37.3 |
| | Amount of deflection (mm), from 10 Kg to 130 Kg | 3.0 | 3.0 | 2.4 | 3.4 | 3.8 | 3.8 |
| | Difference in core hardness (surface-center), JIS-C | 14 | 14 | 13 | 14 | 16 | 16 |
| Intermediate layer | Material of intermediate layer | B | A | A | A | A | A |
| | Surface hardness (Shore D) | 65 | 68 | 68 | 68 | 68 | 68 |
| | Outside diameter (mm) *6 | 40.6 | 40.6 | 40.6 | 40.6 | 40.6 | 40.6 |
| | Thickness (mm) | 1.65 | 1.65 | 1.65 | 1.65 | 1.65 | 1.65 |
| Presence or absence of adhesive between intermediate layer and cover layer *7 | | Yes | Yes | Yes | Yes | Yes | Yes |
| Cover layer | Kind of material for cover layer | J | K | H | H | H | H |
| | Thickness of cover layer (mm) | 1.04 | 1.04 | 1.04 | 1.04 | 1.04 | 1.04 |
| | Surface hardness of cover layer (Shore D) | 56 | 59 | 59 | 59 | 59 | 59 |
| Ball | Outside diameter (mm) | 42.7 | 42.7 | 42.7 | 42.7 | 42.7 | 42.7 |
| | Weight (g) | 45.6 | 45.6 | 45.6 | 45.6 | 45.6 | 45.6 |
| Dimples | Number of dimples | 330 | 330 | 330 | 330 | 330 | 330 |
| | Average depth of dimples (mm) | 0.136 | 0.136 | 0.136 | 0.136 | 0.118 | 0.157 |
| | Kind of dimples | 5 | 5 | 5 | 5 | 5 | 5 |
| Difference in surface hardness (Shore D), (Intermediate layer) − (Cover layer) | | 9.0 | 9.0 | 9.0 | 9.0 | 9.0 | 9.0 |

TABLE 2-continued

| | | | | | | | |
|---|---|---|---|---|---|---|---|
| (Thickness of cover layer) + (Thickness of intermediate layer) (mm) | | 2.69 | 2.69 | 2.69 | 2.69 | 2.69 | 2.69 |
| Flight | W#1 Carry (m) | 236.4 | 238.2 | 237.2 | 236.9 | 237.4 | 235.2 |
| | HS45 Total (m) | 253.3 | 256.0 | 253.5 | 254.1 | 253.7 | 253.3 |
| | Spin (rpm) | 2,830 | 2,730 | 2,900 | 2,620 | 2,700 | 2,710 |
| | Rating | X | ◯ | X | X | X | X |
| Approach spin | SW:HS 16 m/s, spin (rpm) | 6,510 | 6,240 | 6,530 | 6,120 | 6,260 | 6,270 |
| | Rating | ◯ | ◯ | ◯ | ◯ | ◯ | ◯ |
| Feeling | W#1 | ◯ | ◯ | X | X | ◯ | ◯ |
| | Putter | ◯ | ◯ | ◯ | X | ◯ | ◯ |
| Durability | Durability for rebound resilience to decrease after repeated hitting | ◯ | ◯ | ◯ | ◯ | ◯ | ◯ |
| | Resistance to scratches | ◯ | X | ◯ | ◯ | ◯ | ◯ |
| | Durability in topping by iron | ◯ | ◯ | ◯ | ◯ | ◯ | ◯ |

Note to Tables 1 and 2:
*1 Polybutadiene, "BR730" (from JSR)
*2 Isoprene rubber, "IR2200" (from JSR)
*3 Peroxide (1): dicumyl peroxide, "Percumyl D" (from NOF)
*4 Peroxide (2): 1,1-bis(t-butylperoxy)-3,3,5-trimethylcyclohexane, "Superhexa 3M-40" (from NOF)
*5 "Nocrack NS-6" (from Ouchishinko Kagaku)
*6 Diameter of a sphere composed of a core and an intermediate layer enclosing it.
*7 Adhesive between the intermediate layer and the cover layer, "RB-182 Primer" (from Nippon B-Chemical)

TABLE 3

| | Components (pbw) | | | | | | | | | | |
|---|---|---|---|---|---|---|---|---|---|---|---|
| | A | B | C | D | E | F | G | H | I | J | K |
| Himilan 1605 | | 100 | | | | | | | | | |
| Himilan 1557 | | | | | | | | | | | 20 |
| Himilan 1855 | | | | | | | | | | | 30 |
| Surlyn 7930 | 100 | | | | 100 | | | | | | |
| Surlyn 8120 | | | | | | | | | | | 50 |
| Ioteck 8030 | | | 100 | 100 | | | | | | | |
| LA1060 | | | | 5 | | | | | | | |
| Trimethylolpropane | | | | | 0.8 | | | | | | |
| AM7317 | | | | | | 50 | | | | | |
| AM7318 | | | | | | 50 | | | | | |
| Pandex T8260 | | | | | | | 75 | 50 | 100 | | |
| Pandex T8295 | | | | | | | 25 | 50 | | 100 | |
| Titanium dioxide | | | | | 5 | 4 | 4 | 4 | 4 | 1.5 | |
| Polyethylene wax | | | | | | 1.5 | 1.5 | 1.5 | 1.5 | | |
| Isocyanate compound | | | | | | | 10 | 10 | 10 | 10 | |

Note to Table 3:
Himilan: ionomer resin (from Mitsui-DuPont Polychemical)
Surlyn: ionomer resin (from DuPont)
Nucrel: ethylene-methacrylic acid-acrylate ester terpolymer (from Mitsui-DuPont Polychemical)
Ioteck: product of Exxon Mobile Chemical
LA1060: ternary composite material composed of rubber component, polyolefin component, and polyamide component (from Daiwa Polymer)
AM7317: Zn-containing ionomer containing 18% acid (from Mitsui-DuPont Polychemical)
AM7318: Na-containing ionomer containing 18% acid (from Mitsui-DuPont Polychemical)
Dynalon: block copolymer, hydrogenated butadiene-styrene copolymer (from JSR)
Pandex; thermoplastic polyurethane elastomer (from DIC)
Isocyanate compound: "Crossnate EM30" (from Dainichiseika), isocyanate master batch containing 4,4'-diphenylmethane-diisocyanate (30%) in polyester elastomer (corresponding to 5 to 10% isocyanate content determined by amine back titration according to JIS-K1556). It was mixed simultaneously with injection molding.

The following is noted from Tables 1 and 2.

Comparative Example 1

The golf ball is poor in durability for repeated hitting on account of the hard intermediate layer and the large difference in surface hardness between the intermediate layer and the cover layer.

Comparative Example 2

The golf ball causes little spin at the time of approach shot on account of the hard intermediate layer and the large difference in surface hardness between the intermediate layer and the cover layer.

Comparative Example 3

The golf ball is poor in flying distance on account of the excessive total thickness (which leads to excessive spin at the time of shot by W#1). It is also poor in putter feeling.

Comparative Example 4

The golf ball is poor in durability for repeated hitting and scratch resistance on account of the excessive total thickness.

Comparative Example 5

The golf ball is poor in flying distance on account of the excessive total thickness (which leads to excessive spin at the time of shot by W#1).

Comparative Example 6

The golf ball is poor in scratch resistance and durability for topping on account of the excessively thick cover layer.

Comparative Example 7

The golf ball is poor in flying distance on account of the excessively soft intermediate layer (which leads to excessive spin at the time of shot by W#1).

Comparative Example 8

The golf ball is poor in scratch resistance because the cover layer is formed from Surlyn.

Comparative Example 9

The golf ball is poor in flying distance on account of the excessive hard core (which leads to excessive spin at the time of shot by W#1). It is also poor in feeling when hit by W#1.

Comparative Example 10

The golf ball has dull feeling and low rebound resilience and is poor in flying distance when hit by W#1 on account of the excessively soft core.

Comparative Example 11

The golf ball is poor in flying distance (with a high projectile) when hit by W#1 on account of the dimples having an excessively small average depth.

Comparative Example 12

The golf ball is poor in flying distance (with a low projectile) when hit by W#1 on account of the dimples having an excessively large average depth.

Japanese Patent Application No. 2004-038651 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A three-piece solid golf ball having a solid core, an intermediate layer enclosing said solid core, and a cover layer enclosing said intermediate layer and having a large number of dimples formed in its surface, wherein the core deforms as much as 2.6 to 3.2 mm under a load which changes from 10 kg to 130 kg, the cover layer is formed mainly from thermoplastic polyurethane such that it has a lower hardness than said intermediate layer, a surface hardness of said cover layer being 58 to 64 in terms of Shore D hardness, with the difference in hardness between the cover layer and the intermediate layer being 4 to 10 in terms of Shore D hardness, the intermediate layer and the cover layer have a total thickness of 2.2 to 3.0 mm, the cover layer has a thickness of 0.8 to 1.3 mm, and the dimples have at least four different diameters and/or depths, with the diameter being about 2 to 6 mm, the average depth being 0.125 to 0.150 mm, and amount to 330 to 390 in all, wherein the intermediate layer is compounded with trimethylolpropane.

2. The three-piece solid golf ball as defined in claim 1, wherein the solid core has a distributed hardness such that the difference in hardness between the center and the surface is no smaller than 10 in terms of JIS-C hardness.

3. The three-piece solid golf ball as defined in claim 1, wherein the intermediate layer has a surface hardness of 64 to 70 in terms of Shore D hardness.

4. The three-piece solid golf ball as defined in claim 1, wherein the intermediate layer is formed mainly from an ionomer resin.

5. The three-piece solid golf ball as defined in claim 1, wherein the ionomer resin is lithium-containing ionomer resin.

6. The three-piece solid golf ball as defined in claim 1, wherein a surface hardness of the solid core ranges from 60 to 90 JIS-C as measured by applying a JIS-C hardness meter directly to a surface of the solid core.

\* \* \* \* \*